US008705442B2

(12) United States Patent
Osborn

(10) Patent No.: US 8,705,442 B2
(45) Date of Patent: Apr. 22, 2014

(54) SYSTEM, METHOD, AND COMPUTER-READABLE MEDIUM FOR MOBILE STATION AUTHENTICATION AND REGISTRATION VIA AN IP-FEMTOCELL

(75) Inventor: Christopher Martin Edward Osborn, Allen, TX (US)

(73) Assignee: Ubeeairwalk, Inc. (TW)

( * ) Notice: Subject to any disclaimer, the term of this patent is extended or adjusted under 35 U.S.C. 154(b) by 405 days.

(21) Appl. No.: 12/605,517

(22) Filed: Oct. 26, 2009

(65) Prior Publication Data

US 2010/0048174 A1    Feb. 25, 2010

Related U.S. Application Data

(63) Continuation-in-part of application No. 12/252,231, filed on Oct. 15, 2008, now Pat. No. 8,194,590, and a continuation-in-part of application No. 12/252,238, filed on Oct. 15, 2008, and a continuation-in-part of application No. 12/252,246, filed on Oct. 15, 2008, now Pat. No. 8,351,901.

(60) Provisional application No. 61/003,151, filed on Nov. 15, 2007.

(51) Int. Cl.
*H04W 4/00* (2009.01)
*H04M 1/66* (2006.01)
*H04M 1/68* (2006.01)

(52) U.S. Cl.
USPC .................. 370/328; 455/411; 455/435.1

(58) Field of Classification Search
USPC ................. 370/252, 328; 455/411, 435.1
See application file for complete search history.

(56) References Cited

U.S. PATENT DOCUMENTS

| | | | |
|---|---|---|---|
| 6,070,073 A | 5/2000 | Maveddat et al. | |
| 6,236,852 B1 * | 5/2001 | Veerasamy et al. | 455/411 |
| 7,031,747 B2 | 4/2006 | Cry et al. | |
| 7,127,248 B1 | 10/2006 | Costa et al. | |
| 7,174,177 B1 * | 2/2007 | Chander et al. | 455/466 |
| 7,990,912 B2 * | 8/2011 | Nix et al. | 370/328 |
| 8,249,554 B2 * | 8/2012 | Mack et al. | 455/411 |
| 2003/0119518 A1 | 6/2003 | Cleveland et al. | |
| 2005/0101329 A1 | 5/2005 | Gallagher | |
| 2005/0186948 A1 | 8/2005 | Gallagher et al. | |
| 2006/0154646 A1 * | 7/2006 | Tung | 455/411 |
| 2007/0014281 A1 | 1/2007 | Kant | |

(Continued)

*Primary Examiner* — Farah Faroul

(57) ABSTRACT

A system, method, and computer readable medium for facilitating mobile station registration and authentication via a femtocell system are provided. A femtocell system receives a registration request from a mobile station and transmits a registration request to a core network on behalf of the mobile station. The registration request transmitted by the femtocell system preferably includes a register identifier generated by the femtocell system. The convergence server may be located in an Internet Protocol core network and may be configured to emulate a mobile switching center. On receipt of a registration request from the femtocell system, the convergence server may engage in a registration and authentication procedure with a radio access network Home Location Register and/or Authentication Center on behalf of the mobile station. Alternatively, the convergence server may be located in an Internet Protocol Multimedia Subsystem (IMS) core network in which the convergence server is configured as an IMS application server. In this configuration, the femtocell system transmits the register request to a serving-call session control function that initiates a third-party registration process with the convergence server.

11 Claims, 7 Drawing Sheets

(56) References Cited

U.S. PATENT DOCUMENTS

| | | |
|---|---|---|
| 2007/0238448 A1 | 10/2007 | Gallagher et al. |
| 2007/0243872 A1 | 10/2007 | Gallagher et al. |
| 2007/0254648 A1 | 11/2007 | Zhang et al. |
| 2008/0040606 A1* | 2/2008 | Narayanan et al. ........... 713/169 |
| 2008/0096553 A1 | 4/2008 | Saksena et al. |
| 2008/0293382 A1* | 11/2008 | Lubenski et al. ............. 455/411 |
| 2008/0304462 A1 | 12/2008 | Burgess et al. |
| 2008/0318551 A1* | 12/2008 | Palamara et al. ............. 455/411 |
| 2009/0067417 A1* | 3/2009 | Kalavade et al. ............. 370/356 |
| 2009/0094683 A1* | 4/2009 | Morgan et al. ..................... 726/4 |
| 2009/0111427 A1* | 4/2009 | Mack et al. .................... 455/411 |
| 2009/0156213 A1* | 6/2009 | Spinelli et al. ................ 455/436 |
| 2009/0172397 A1* | 7/2009 | Kim ............................... 713/168 |
| 2009/0191844 A1* | 7/2009 | Morgan et al. ................ 455/411 |
| 2010/0048176 A1* | 2/2010 | Osborn ......................... 455/411 |
| 2010/0151868 A1* | 6/2010 | Shinozaki ..................... 455/445 |
| 2011/0269428 A1* | 11/2011 | Morgan et al. ................ 455/411 |
| 2012/0184249 A1* | 7/2012 | Morgan et al. ................ 455/411 |
| 2012/0238247 A1* | 9/2012 | Wen et al. ..................... 455/411 |

\* cited by examiner

SYSTEM, METHOD, AND COMPUTER-READABLE MEDIUM FOR MOBILE STATION AUTHENTICATION AND REGISTRATION VIA AN IP-FEMTOCELL

CROSS REFERENCE TO RELATED APPLICATIONS

This application is a continuation-in-part of U.S. Ser. No. 12/252,231 field Oct. 15, 2008, entitled, "SYSTEM, METHOD, AND COMPUTER-READABLE MEDIUM FOR PROCESSING CALL ORIGINATIONS BY A FEMTOCELL SYSTEM", this application is also a continuation-in-part of U.S. Ser. No. 12/252,238 filed Oct. 15, 2008, entitled, "SYSTEM, METHOD, AND COMPUTER-READABLE MEDIUM FOR SHORT MESSAGE SERVICE PROCESSING BY A FEMTOCELL SYSTEM", this application is also a continuation-in-part of U.S. Ser. No. 12/252,246 filed on Oct. 15, 2008, entitled, "SYSTEM, METHOD, AND COMPUTER-READABLE MEDIUM FOR USER EQUIPMENT REGISTRATION AND AUTHENTICATION PROCESSING BY A FEMTOCELL SYSTEM" the disclosures of each of which are incorporated herein by reference and each of which claims priority of U.S. provisional patent application Ser. No. 61/003,151, entitled, "SIP-IOS adapter function", filed Nov. 15, 2007, the disclosure of which is incorporated herein by reference. Incorporated by reference is U.S. Ser. No. 12/252,237 filed Oct. 15, 2008, entitled, "SYSTEM, METHOD, AND COMPUTER-READABLE MEDIUM FOR CALL TERMINATION PROCESSING BY A FEMTOCELL SYSTEM" and U.S. Ser. No. 12/252,242 filed Oct. 15, 2008, entitled, "SYSTEM, METHOD, AND COMPUTER-READABLE MEDIUM FOR SHORT MESSAGE SERVICE TERMINATION PROCESSING BY A FEMTOCELL SYSTEM" and U.S. Ser. No. 12/252,199 filed Oct. 15, 2008, entitled, "SYSTEM, METHOD, AND COMPUTER-READABLE MEDIUM FOR IP-FEMTOCELL PROVISIONED RADIO ACCESS NETWORK" and U.S. Ser. No. 12,252,202 filed Oct. 15, 2008, entitled, "SYSTEM, METHOD AND SOMPUTER-READABLE MEDIUM FOR USER EQUIPMENT HANDOFF WITHIN AN IP-FEMTOCELL NETWORK" and U.S. Ser. No. 12/252,204 filed Oct. 15, 2008, entitled, "SYSTEM, METHOD, AND COMPUTER-READABLE MEDIUM FOR USER EQUIPMENT ACQUISITION OF AN IP-FEMTOCELL SYSTEM" and U.S. Ser. No. 12/252,210 filed Oct. 15, 2008, entitled, "SYSTEM, METHOD, AND COMPUTER-READABLE MEDIUM FOR USER EQUIPMENT HANDOFF FROM A MACROCELLULAR NETWORK TO AN IP-FEMTOCELL NETWORK" and U.S. Ser. No. 12/252,212 filed Oct. 15, 2008, entitled, "SYSTEM, METHOD, AND COMPUTER-READABLE MEDIUM FOR CONFIGURATION OF AN IP-FEMTOCELL SYSTEM" and U.S. Ser. No. 12/252,217 filed Oct. 15, 2008, entitled, "SYSTEM, METHOD, AND COMPUTER-READABLE MEDIUM FOR MOBILE-TO-MOBILE CALLS WITHIN FEMTOCELL NETWORK" and U.S. Ser. No. 12/252,222 filed Oct. 15, 2008, entitled, "SYSTEM, METHOD, AND COMPUTER-READABLE MEDIUM FOR ACCESS RESTRICTION OF USER EQUIPMENT DEVICES IN AN IP-FEMTOCELL SYSTEM" and U.S. Ser. No. 12/252,226 filed Oct. 15, 2008, entitled, "SYSTEM, METHOD, AND COMPUTER-READABLE MEDIUM FOR ABBREVIATED-CODE DIALING IN A NETWORK SYSTEM" and U.S. Ser. No. 12/252,227 filed Oct. 15, 2008, entitled, "SYSTEM, METHOD, AND COMPUTER-READABLE MEDIUM FOR MULTI-STAGE TRANSMIT PROTECTION IN A FEMTOCELL SYSTEM" and U.S. Ser. No. 12/252,234 filed Oct. 15, 2008, entitled, "SYSTEM, METHOD, AND COMPUTER-READABLE MEDIUM FOR MOBILE TERMINATED CALL PROCESSING BY A FEMTOCELL SYSTEM" and PCT Ser. No. PCT/US08/80031 filed Oct. 15, 2008, entitled, "SYSTEM, METHOD, AND COMPUTER-READABLE MEDIUM FOR PROCESSING CALL ORIGINATIONS BY A FEMTOCELL SYSTEM" and PCT Ser. No. PCT/US08/80032 filed Oct. 15, 2008, entitled, "SYSTEM, METHOD, AND COMPUTER-READABLE MEDIUM FOR SHORT MESSAGE SERVICE PROCESSING BY A FEMTOCELL SYSTEM" and PCT Ser. No. PCT/US08/80033 filed Oct. 15, 2008, entitled, "SYSTEM, METHOD, AND COMPUTER-READABLE MEDIUM FOR USER EQUIPMENT REGISTRATION AND AUTHENTICATION PROCESSING BY A FEMTOCELL SYSTEM".

FIELD OF THE INVENTION

The present invention is generally related to radio access technologies and, more particularly, to mechanisms for facilitating mobile station registration and authentication via a femtocell system.

BACKGROUND OF THE INVENTION

Contemporary cellular radio systems, or mobile telecommunication systems, provide an over-the-air interface to wireless mobile stations (MSs), also referred to as user equipments (UEs), via a radio access network (RAN) that interfaces with at least one core network. The RAN may be implemented as, for example, a CDMA2000 RAN, a Universal Mobile Telecommunications System (UMTS) RAN, a Global System for Mobile communications (GSM) RAN, or another suitable radio access network implementation. The MSs may comprise, for example, a mobile terminal such as a mobile telephone, a laptop computer featuring mobile telephony software and hardware, a personal digital assistant (PDA), or other suitable equipment adapted to transfer and receive voice or data communications with the radio access network.

A RAN covers a geographical area comprised of any number of cells each comprising a relatively small geographic area of radio coverage. Each cell is provisioned by a cell site that includes a radio tower, e.g., a base transceiver station (BTS), and associated equipment. BTSs communicate with MSs over an air interface within radio range of the BTSs.

Numerous BTSs in the RAN may be communicatively coupled to a base station controller (BSC), also commonly referred to as a radio network controller (RNC). The BSC manages and monitors various system activities of the BTSs serviced thereby. BSCs are typically coupled with at least one core network.

BTSs are typically deployed by a carrier network in areas having a high population density. The traffic capacity of a cell site is limited by the site's capacity and affects the spacing of cell sites. In suburban areas, sites are often up to two miles apart, while cell sites deployed in dense urban areas may be as close as one-quarter of a mile apart. Because the traffic capacity of a cell site is finitely limited, as is the available frequency spectrum, mobile operators have a vested interest in technologies that allow for increased subscriber capacity.

A microcell site comprises a cell in a mobile phone network that covers a limited geographic area, such as a shopping center, hotel, airport, or other infrastructure that may have a high density mobile phone usage. A microcell typically uses power control to limit the radius of the microcell coverage. Typically a microcell is less than a mile wide.

Although microcells are effective for adding network capacity in areas with high mobile telephone usage, microcells extensively rely on the RAN, e.g., a controlling BSC and other carrier functions. Because contemporary BSCs have limited processing and interface capacity, the number of BTSs—whether microcell BTSs or typical carrier BTSs—able to be supported by the BSC or other RAN functions is disadvantageously limited.

Contemporary interest exists in providing enterprise and office access, including small office/home office (SOHO) radio access, by an even smaller scale BTS. The radio coverage area of such a system is typically referred to as a femtocell. In a system featuring a femtocell, an MS may be authorized to operate in the femtocell when proximate the femtocell system, e.g., while the MS is located in the SOHO. When the MS moves beyond the coverage area of the femtocell, the MS may then be serviced by the carrier network. The advantages of deployment of femtocells are numerous. For instance, mobile users frequently spend large amounts of time located at, for example, home, and many such users rely extensively on cellular network service for telecommunication services during these times. For example, a recent survey indicated that nearly thirteen percent of U.S. cell phone customers do not have a landline telephone and rely solely on cell phones for receiving telephone service. From a carrier perspective, it would be advantageous to have telephone services provisioned over a femtocell system, e.g., deployed in the user's home, to thereby reduce the load and effectively increase the capacity on the carrier RAN infrastructure. However, no efficient mechanisms have been provided for efficiently providing a convergence of femtocell and macrocellular systems in a manner that facilitates registration and authentication of mobile stations via a femtocell system.

Therefore, what is needed is a mechanism that overcomes the described problems and limitations.

SUMMARY OF THE INVENTION

The present invention provides a system, method, and computer readable medium for provisioning radio access via a femtocell system. A femtocell system may generate a register identification of a mobile station from one or more mobile station authentication parameters. On receipt of a registration request from a mobile station, the femtocell system may transmit a registration request to a core network on behalf of the mobile station. The registration request transmitted by the femtocell system preferably includes the register identification generated by the femtocell system. In an embodiment, the convergence server may be located in an Internet Protocol core network. In this configuration, the convergence server may be configured to emulate a mobile switching center. On receipt of a registration request from the femtocell system, the convergence server may engage in a registration and authentication procedure with a radio access network Home Location Register and/or Authentication Center on behalf of the mobile station. In another implementation, the convergence server may be located in an Internet Protocol Multimedia Subsystem (IMS) core network. In this configuration, the convergence server is emulated as an IMS application server. The femtocell system transmits the register request to a serving-call session control function (S-CSCF) that, in turn, initiates a third-party registration process with the convergence server on behalf of the mobile station. The convergence server then performs authentication and registration procedures with the radio access network HLR and/or AC and notifies the femtocell system of either success or failure of the mobile station authentication and registration.

In accordance with an embodiment, a method of providing mobile station registration and authentication services in a network system is provided. A convergence server located in a first core network receives a session initiation protocol registration request for a mobile station transmitted to the first core network, receives authentication parameters of the mobile station, and performs authentication and registration procedures with a radio access core network on behalf of the mobile station.

In accordance with another embodiment, a computer-readable medium having computer-executable instructions tangibly embodied thereon for execution by a processing system, the computer-executable instructions for facilitating mobile station registration and authentication services in a network system is provided. The computer-executable instructions, when executed, cause the processing system to generate a registration identifier that is associated with a mobile station from at least one of a plurality of authentication parameters of the mobile station, receive, by a convergence server located in a first core network, a session initiation protocol registration request for the mobile station transmitted to the first core network, receive, by the convergence server, the plurality of authentication parameters of the mobile station, and perform, by the convergence server, authentication and registration procedures with a radio access core network on behalf of the mobile station.

In accordance with another embodiment, a network system that provides mobile station registration and authentication services is provided. The network system includes a first core network that includes a convergence server, a radio access core network, and an Internet Protocol-based femtocell system that provides a radio access point for one or more mobile stations. The femtocell system periodically transmits an overhead message train that includes a random number generated by the femtocell system. A mobile station receives the overhead message train, calculates a registration authentication result from data including the random number, and transmits a registration request including the registration authentication and a plurality of authentication parameters. On receipt of the registration request from the mobile station, the femtocell system generates a registration identifier that is associated with the mobile station from at least one of the plurality of authentication parameters of the mobile station. The convergence server receives a session initiation protocol registration request for the mobile station transmitted to the first core network and the plurality of authentication parameters of the mobile station. The convergence server performs authentication and registration procedures with the radio access core network on behalf of the mobile station.

BRIEF DESCRIPTION OF THE DRAWINGS

Aspects of the present disclosure are best understood from the following detailed description when read with the accompanying figures, in which.

DETAILED DESCRIPTION OF THE INVENTION

It is to be understood that the following disclosure provides many different embodiments or examples for implementing different features of various embodiments. Specific examples of components and arrangements are described below to simplify the present disclosure. These are, of course, merely examples and are not intended to be limiting.

Figure 1:
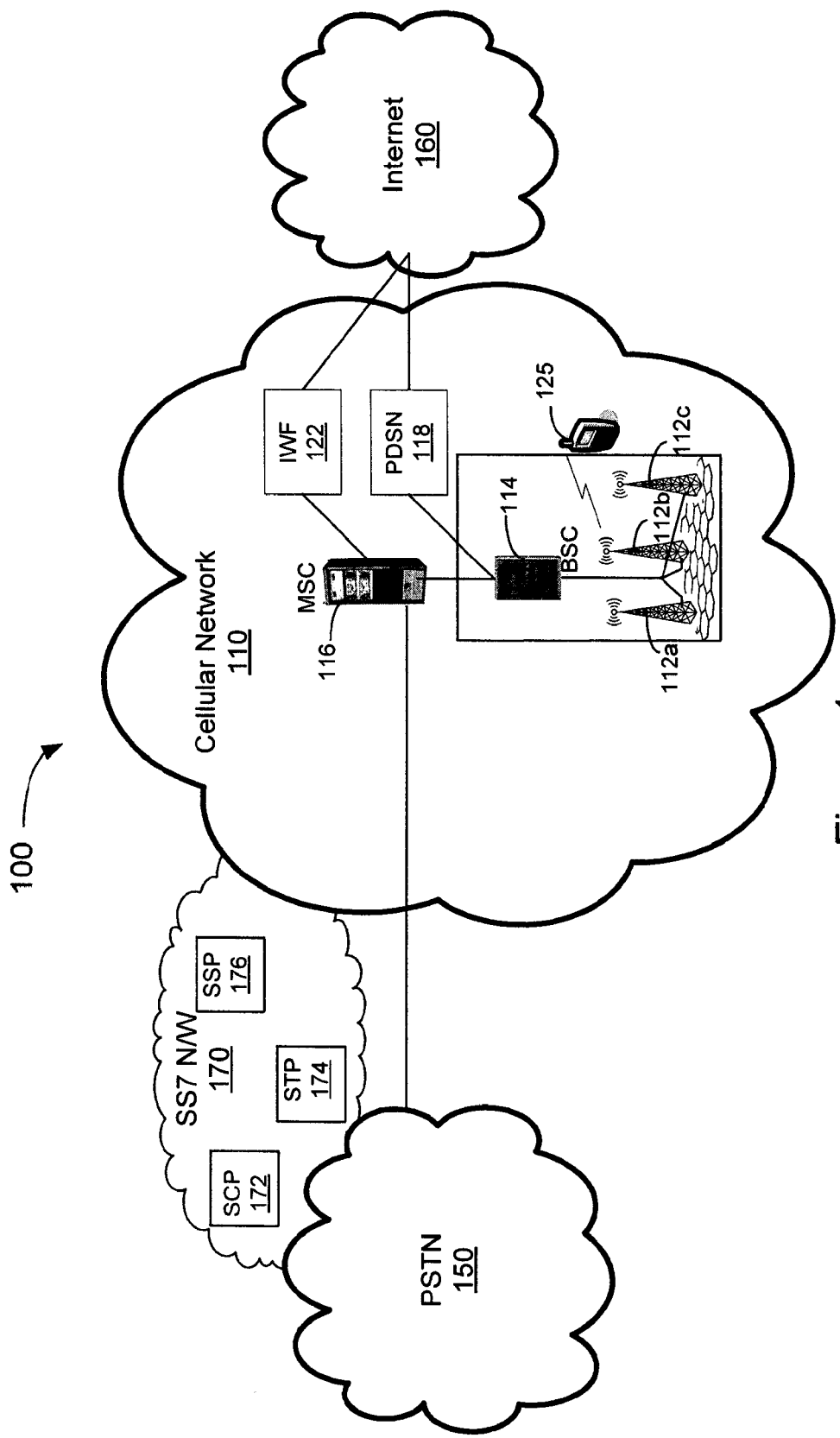
FIG. 1 is a diagrammatic representation of a network system that includes a cellular network adapted to provide macro-cellular coverage to a mobile station.

FIG. 1 is a diagrammatic representation of a network system 100 that includes a cellular network 110 adapted to provide macro-cellular coverage to a mobile station. Cellular network 110 may comprise, for example, a code-division multiple access (CDMA) network, such as a CDMA-2000 network.

Cellular network 110 may include any number of base transceiver stations (BTSs) 112a-112c communicatively coupled with a base station controller (BSC) 114 or RNC. Each individual BTS 112a-112c under the control of a given BSC may define a radio cell operating on a set of radio channels thereby providing service to an MS 125, such as a mobile terminal. BSC 114 manages the allocation of radio channels, receives measurements from mobile terminals, controls handovers, as well as various other functions as is understood. BSC 114 is interconnected with a Mobile Switching Center (MSC) 116 that provides mobile terminal exchange services. BSC 114 may be additionally coupled with a packet data serving node (PDSN) 118 or other gateway service that provides a connection point between the CDMA radio access network and a packet network, such as Internet 160, and provides mobility management functions and packet routing services. MSC 116 may communicatively interface with a circuit switched network, such as the public switched telephone network (PSTN) 150, and may additionally be communicatively coupled with an interworking function (IWF) 122 that provides an interface between cellular network 110 and PSTN 150.

System 100 may also include a signaling system, such as a signaling system #7 (SS7) network 170. SS7 network 170 provides a set of telephony signaling protocols which are used to set up the vast majority of the world's PSTN telephone calls. SS7 network 170 is also used in cellular networks for circuit switched voice and packet-switched data applications. As is understood, SS7 network 170 includes various signaling nodes, such as any number of service control points (SCPs) 172, signal transfer points (STPs) 174, and service switching points (SSPs) 176.

BTSs 112a-112c deployed in cellular network 110 may service numerous network 110 subscribers. Cell cites provided by BTSs 112a-112c commonly feature site ranges of a quarter to a half mile, e.g., in densely populated urban areas, to one to two miles in suburban areas. In other remotely populated regions with suitable geography, site ranges may span tens of miles and may be effectively limited in size by the limited transmission distance of relatively low-powered MSs. As referred to herein, a cell provided by a BTS deployed in carrier network 110 for access by any authorized network 110 subscriber is referred to as a macrocell.

Figure 2:
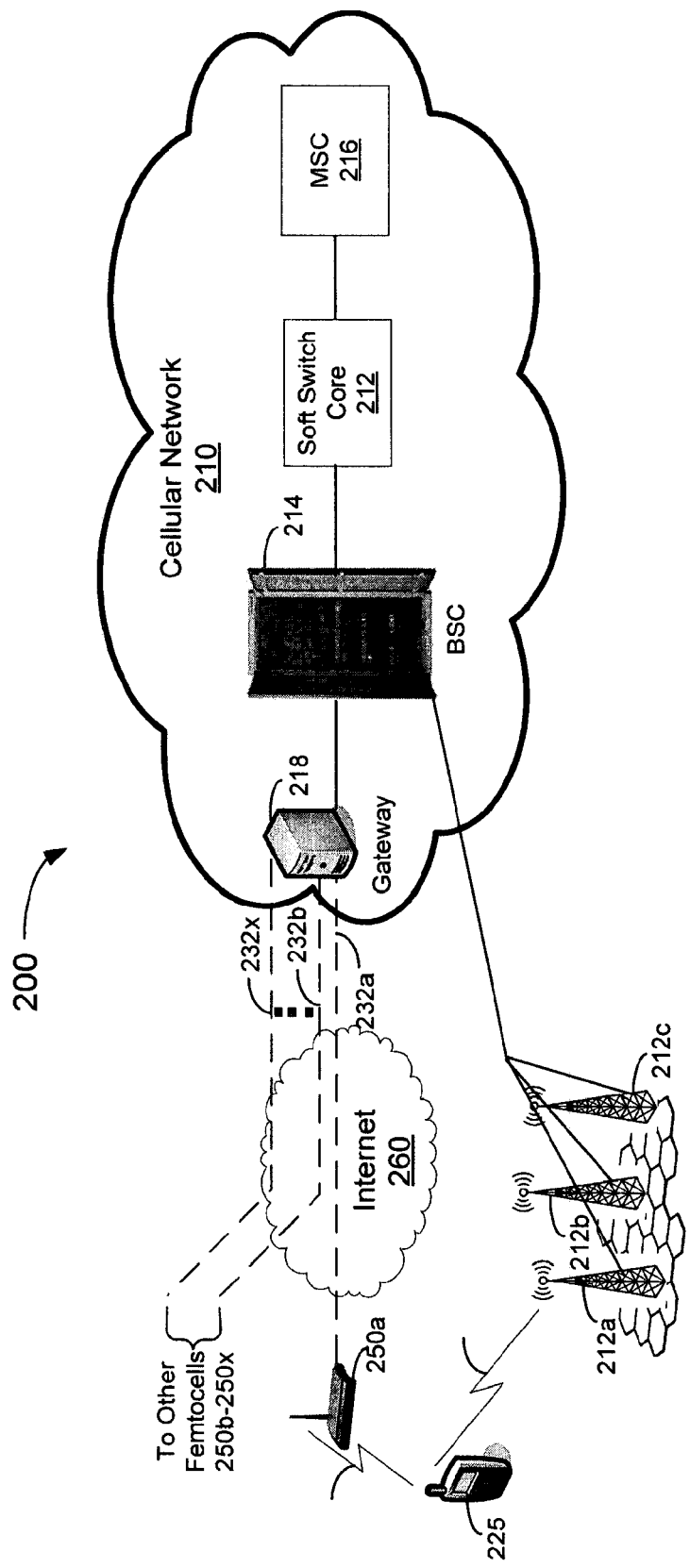
FIG. 2 is a diagrammatic representation of a conventional network system configuration featuring a femtocell system.

FIG. 2 is a diagrammatic representation of a conventional network system 200 configuration featuring a femtocell. In the depicted example, a central BSC 214 deployed in a cellular carrier network 210 may connect with a soft switch core 212 that is connected with a MSC 216. MSC 216 connects with the cellular core network and may interface with other networks, such as the PSTN as is understood. BSC 214 may be connected with and service numerous BTSs 212a-212c that provide macrocells to cellular network 210 subscribers.

BSC 214 may additionally connect with a tunnel gateway system 218 that is adapted to establish secured tunnels 232a-232x with respective femtocell systems 250a-250x. Femtocells comprise cellular access points that connect to a mobile operator's network using, for example, a residential Digital Subscriber Line (DSL) or cable broadband connection. Femtocells 250a-250x provide a radio access point for MS 225 when the MS is within range of a femtocell system with which the MS has authorized access. For example, femtocell system 250a may be deployed in a residence of the user of MS 225. Accordingly, when the user is within the residence, mobile telecommunications may be provided to MS 225 via an air-interface provided by femtocell system 250a. In this instance, MS 225 is effectively offloaded from the macro BTS, e.g., BTS 212a, and communications to and from the MS are carried out with femtocell system 250a over Internet 260. Thus, femtocell systems 250a-250x may reduce the carrier radio resource demands by offloading MSs from macrocells to femtocells and thereby provide for increased subscriber capacity of cellular network 210.

In contemporary implementations such as that depicted in FIG. 2, a femtocell system 250a comprises a transceiver without intelligence and is thus required to be connected and managed by BSC 214. Thus, femtocell systems 250a-250x are reliant on the carrier network centralized BSC 214 which has limited capacity and thus does not exhibit desirable scaling characteristics or capabilities. Moreover, high communications overhead are realized by the BTS backhaul.

Figure 3A:
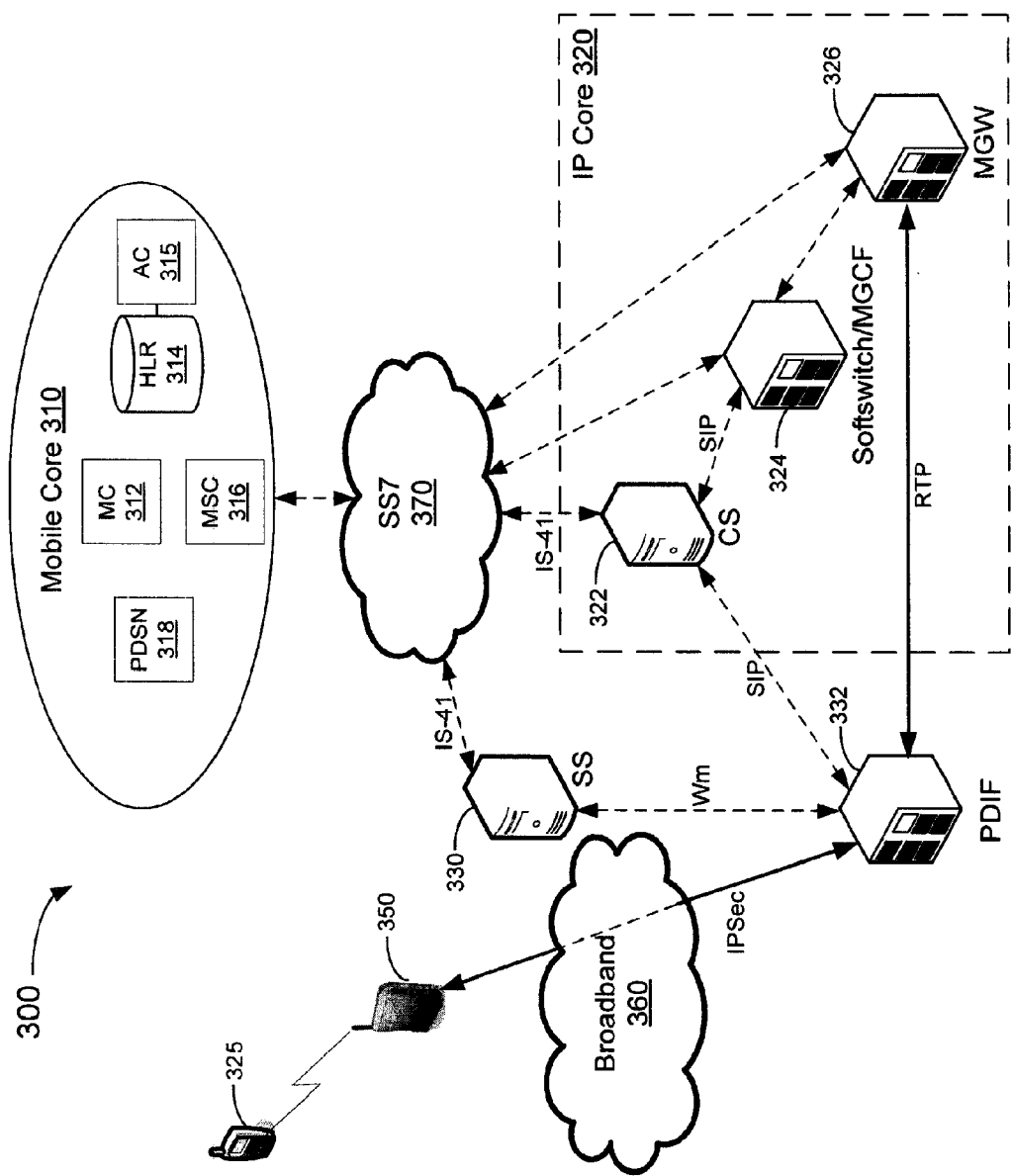
FIG. 3A is a diagrammatic representation of a network system in which a femtocell system implemented in accordance with an embodiment of the invention may be deployed.

FIG. 3A is a diagrammatic representation of a network system 300 in which a femtocell system implemented in accordance with an embodiment of the invention may be deployed. System 300 includes a mobile core network 310 implemented as, for example, a code division multiple access (CDMA) core network that interfaces with a SS7 network 370. Mobile core network 310 may include a Messaging Center (MC) 312, a Home Location Register (HLR) 314, an authentication center (AC) 315, a Mobile Switching Center (MSC) 316, a Packet Data Serving Node (PDSN) 318, and various other components. The HLR 314 is a central database that contains details of each MS subscriber authorized to use the mobile core network 310. There may be several HLRs deployed in the core network 310. The HLR 314 maintains details of each Subscriber Identity Module (SIM) card issued by the mobile network operator, e.g., the International Mobile Subscriber Identity (IMSI) stored in the SIM card, services authorized for the associated user, a location of the MS, and various other information. The HLR 314 may interface with the AC 315 that functions to facilitate authentication of MSs that access the cellular network. The MSC 316 provides mobile terminal exchange services and may communicatively interface with a circuit switched network, such as the public switched telephone network. The MSC 316 handles voice calls and Short Message Service (SMS), sets up and releases end-to-end connections, and handles mobility and hand-over requirements during calls as well as other functions. The PDSN 318 provides an interface between the radio access and IP networks. The PDSN 318 provides, for example, mobility management functions and packet routing functionality.

System 300 includes an Internet Protocol (IP) core network 320 that interfaces with the SS7 network 370, e.g., via IS-41. In accordance with an embodiment, the IP core network 320 includes a convergence server (CS) 322, a softswitch/Media Gateway Controller Function (MGCF) 324, and a Media Gateway (MGW) 326 among other components. The CS 322 may be communicatively coupled with the SS7 network 370 and a Packet Data Interworking Function (PDIF) 332, e.g., via Session Initiation Protocol (SIP) communications. The CS 322 provides SIP registration functions and a central interface point to Voice over Internet Protocol (VoIP) elements and the softswitch/MGCF 324. The CS 322 further provides SIP-MSC and Interworking functions between existing VOIP network elements and the operator's core network. To this end, the CS 322 may interface directly with the MC 312 and the HLR 314 using, for example, a TIA-41 interface.

The softswitch/MGCF 324 may be communicatively coupled with the CS 322, e.g., via SIP communications, with the SS7 network 370, and with the MGW 326. The softswitch/MGCF 324 may connect calls from one device to another and perform call control protocol conversion, for example, between SIP and ISDN User Part (ISUP). The MGW 326 may be communicatively coupled with the SS7 network 370 and the PDIF 332 in addition to the softswitch/MGCF 324. The MGW 326 may convert data between real-time transport protocol (RTP) and pulse code modulation (PCM), and may also be employed for transcoding. Resources of the MGW 326 may be controlled by the softswitch/MGCF 324.

In accordance with an embodiment, the system 300 may include a Security Server (SS) 330 that interfaces with the SS7 network 370, e.g., via IS-41, and the PDIF 332, e.g., via a Wm interface. The PDIF 332 facilitates access to the IP core network 320 via WiFi access points and may be responsible for such services as, for example, security, access, authentication, policy enforcement, user information collection, and IP address allocation as well as other services. The PDIF 332 may interface, e.g., via SIP communications, with the CS 322, and may have Real-time Transport Protocol (RTP) communications with the MGW 326. Further, the PDIF 332 may have secured IP communications, e.g., IPsec, established with one or more femtocell systems, e.g., a femtocell system 350 deployed at a user premise, such as a home office. The secured communications may be established between the PDIF 332 and the femtocell system 350 over, for example, a broadband network 360 interface such as a residential DSL or cable broadband connection. The femtocell system 350, in turn, provides a radio access point for one or more MSs 325 when the MS 325 is within range of the femtocell system 350 with which the MS 325 has authorized access.

In accordance with an embodiment, a femtocell system 350 may include integrated BTS and BSC functions and may feature additional capabilities available in the provided femtocell site coverage area. Femtocell system 350 provides an IP-accessible radio access network, is adapted for operation with IP core network 320, and provides radio link control functions. Femtocell system 350 may be communicatively coupled with broadband network 360 via any variety of backhaul technologies, such as an 802.11x link, a 10/100 BaseT LAN link, a T1/E1 Span or fiber, cable set top box, DSL modem connected with a central office digital subscriber line access multiplexer, a very small aperture terminal (VSAT), or another suitable backhaul infrastructure.

In an embodiment, femtocell system 350 includes a session initiation protocol (SIP) adapter that supports a SIP client pool and provides conversion of call set-up functions to SIP client set-up functions. To this end, the femtocell system 350 may be allocated an IP address. Additionally, femtocell system 350 includes electronic serial number (ESN) screening and/or Mobile Equipment Identifier (MEID) screening to allow only designated MSs to access the femtocell. Configuration of the femtocell system 350 with ESN(s) or MEID(s) may be made as part of an initial femtocell system 350 activation.

In another embodiment, a femtocell system 350 may be implemented as a 3G-complinat entity, e.g., to service UMTS mobile terminals, and may be deployed in a small office/home office (SOHO) or other suitable enterprise. To this end, the femtocell system 350 may include an integrated RNC and radio node (RN). In a particular implementation, the femtocell system 350 may be implemented as an Evolution-Data Optimized (EV-DO) entity, e.g., a 1xEV-DO integrated IP-RAN. The femtocell system 350 provides an IP-accessible radio access network and provides radio link control functions.

Figure 3B:
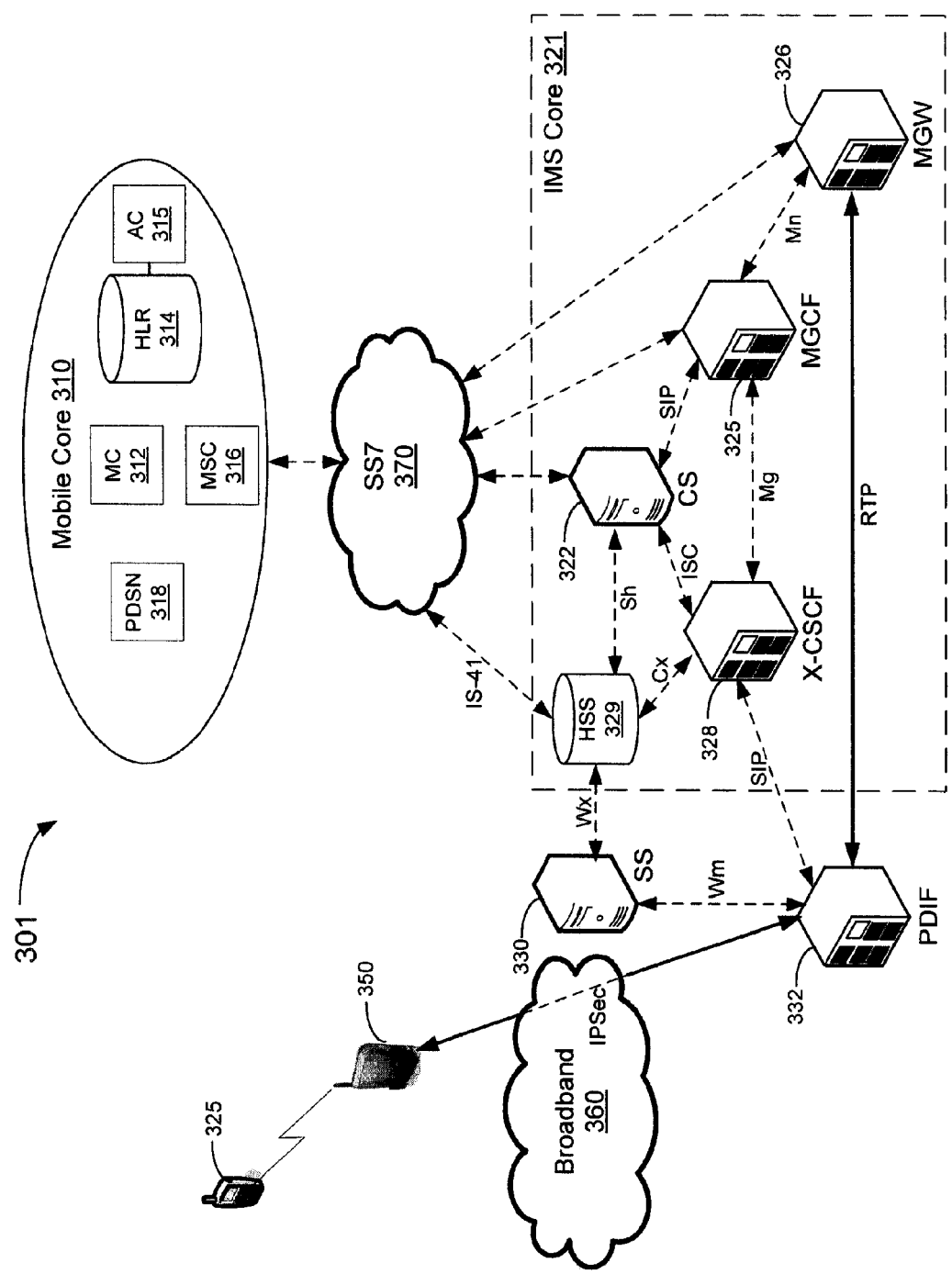
FIG. 3B is a diagrammatic representation of an alternative network system in which a femtocell system implemented in accordance with an embodiment of the invention may be deployed.

FIG. 3B is a diagrammatic representation of an alternative network system 301 in which a femtocell system implemented in accordance with an embodiment of the invention may be deployed. System 301 includes a mobile core network 310 implemented as, for example, a CDMA core network that interfaces with a SS7 network 370. The mobile core network 310 may include an MC 312, an HLR 314, an AC 315, an MSC 316, and a PDSN 318, and various other components as described above with regard to the mobile core network 310 of FIG. 3A.

System 301 includes an IP Multimedia Subsystem (IMS) core network 321 that interfaces with the SS7 network 370. In accordance with an embodiment, the IMS core network 321 includes a CS 322, a MGCF 325, an MGW 326, an X-Call Session Control Function (X-CSCF) 328, and a Home Subscriber Server (HSS) 329 among other components. The X-CSCF 328 processes SIP signaling packets and provides a centralized interface for control and signaling including SIP registration functions in accordance with disclosed embodiments. The X-CSCF 328 may provide Interrogating-CSCF (I-CSCF) services, Proxy-CSCF (P-CSCF) services, and Serving-CSCF (S-CSCF) services. The X-CSCF 328 comprises various SIP servers or proxies that process SIP signaling packets in the IMS core network 321. P-CSCF services provided by X-CSCF may include provisioning a first point of contact for an IMS-compliant MS. In such a situation, the X-CSCF may be located in a visited network or in an MS's home network if the visited network is not fully IMS-compliant. An MS may discover the X-CSCF 328, e.g., by using Dynamic Host Configuration Protocol (DHCP), or by assignment in a packet data protocol context. S-CSCF services provided by the X-CSCF 328 include provisioning as a central node of the signaling plane. To this end, the S-CSCF comprises a SIP server, but additionally performs session control. Further, the X-CSCF 328 is interfaced with the HSS 329 and/or HLR 314 to download and upload user profiles for providing S-CSCF services. The X-CSCF 328 further includes a SIP function for providing I-CSCF services. To this end, the X-CSCF 328 has an IP address that is published in the Domain Name System (DNS) that facilitates location of the X-CSCF 328 by remote servers. Thus, I-CSCF services of the X-CSCF 328 may be used as a forwarding point for receipt of SIP packets within the domain.

The CS 322 may be configured to operate as an IMS application server that interfaces with the X-CSCF 328 using the ISC interface. The HSS 329 comprises a user database that supports IMS network entities that manage or service calls. The HSS 329 contains subscription-related information, e.g., subscriber profiles, may perform authentication and authorization of users, and may provide information about locations of MSs and IP information. In a fully standard IMS architecture, the CS 322 may interface with the HSS 329. However, in other scenarios, the HLR 314 may anchor the service even with the HSS 329 deployed within the system 301. Accordingly, the CS 322 may be communicatively interfaced with the HLR 314 for location updates using, for example, a TIA-41 interface. Further, the CS 322 is preferably interfaced with the MC 312 using, for example, a TIA-41 interface.

The CS 322 may be communicatively coupled with the SS7 network 370, the MGCF 325, e.g., via SIP communications, the X-CSCF 328, e.g., via ISC, and the HSS 329, e.g., via an Sh interface. The MGCF 325 may be communicatively coupled with the MGW 326, e.g., via an Mn interface, the X-CSCF 328, e.g., via an Mg interface, and the SS7 network 370 in addition to the CS 322. The MGW 326 may be communicatively coupled with the SS7 network 370 and a PDIF 332 in addition to the MGCF 325. The MGW 326 may convert data between RTP and PCM, and may also be employed for transcoding. Resources of the MGW 326 may be controlled by the MGCF 325. The X-CSCF 328 may be communicatively coupled with the PDIF 332 for exchanging SIP communications therewith and the HSS 329, e.g., via a Cx interface, in addition to the CS 322 and the MGCF 325. The HSS 329 may be communicatively coupled with the SS7 network 370, e.g., via IS-41, and a SS 330, e.g., via a Wx interface. The SS 330 may be coupled with the PDIF 332, e.g., via a Wm interface.

The PDIF 332 facilitates access to the IMS core network 321 via WiFi access points and may be responsible for such services as, for example, security, access, authentication, policy enforcement, user information collection, and IP address allocation as well as other services. The PDIF 332 may have RTP communications with the MGW 326. Further, the PDIF 332 may have secured IP communications, e.g., IPsec, established with one or more femtocell systems, e.g., a femtocell system 350 deployed at a user premise, such as a home office. The secured communications may be established between the PDIF 332 and the femtocell system 350 over, for example, a broadband network 360 interface such as residential DSL or cable broadband connection. The femtocell system 350, in turn, provides a radio access point for one or more MSs 325 when the MS 325 is within range of the femtocell system 350 with which the MS 325 has authorized access.

Figure 4:
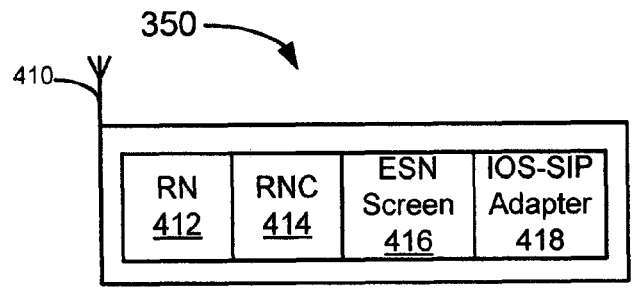
FIG. 4 is a simplified diagrammatic representation of femtocell system that facilitates provisioning of a femto-RAN in accordance with an embodiment.

FIG. 4 is a simplified diagrammatic representation of femtocell system 350 that facilitates provisioning of a femto-RAN in accordance with an embodiment. Femtocell system 350 includes an antenna 410 coupled with a RN 412. RN 412 may be implemented, for example, as a 1xEV-DO ASIC device for provisioning a 1xEV-DO Rev. 0 air interface or a 1xEV-DO Rev. A air interface. RN 412 may be communicatively coupled with a RNC 414 that provides radio control functions, such as receiving measurements from MSs, control of handovers to and from other femtocell systems, and may additionally facilitate handoff to or from macrocells. RNC 414 may also provide encryption/decryption functions, power, load, and admission control, packet scheduling, and various other services.

Femtocell system 350 includes an electronic serial number screening function 416 that may facilitate approving or rejecting service for an MS by femtocell system 350. Additionally, femtocell system 350 includes an Internet Operating System (IOS) and SIP Adapter (collectively referred to as IOS-SIP Adapter 418). IOS-SIP adapter 418 may invoke and manage SIP clients, such as a user agent (UA) pool comprising one or more UAs. Each MS authorized to be serviced by femtocell system 350 may have a UA allocated therefor by femtocell system 350 in a manner that facilitates transmission of communications to and from an MS over an IP backhaul. Accordingly, when an authorized MS is within the femtocell system 350 site range, telecommunication services may be provided to the MS via the IP backhaul and the femtocell system 350 provisioned RAN. When the MS is moved beyond the service range of femtocell system 350, telecommunication service may then be provided to the MS via macrocellular coverage. Femtocell system 350 may perform a DNS/ENUM registration on behalf of MSs authorized to obtain service from femtocell system 350 and may generate and issue a SIP registration on behalf of an MS authorized for service access by the femtocell system 350.

Figure 5:
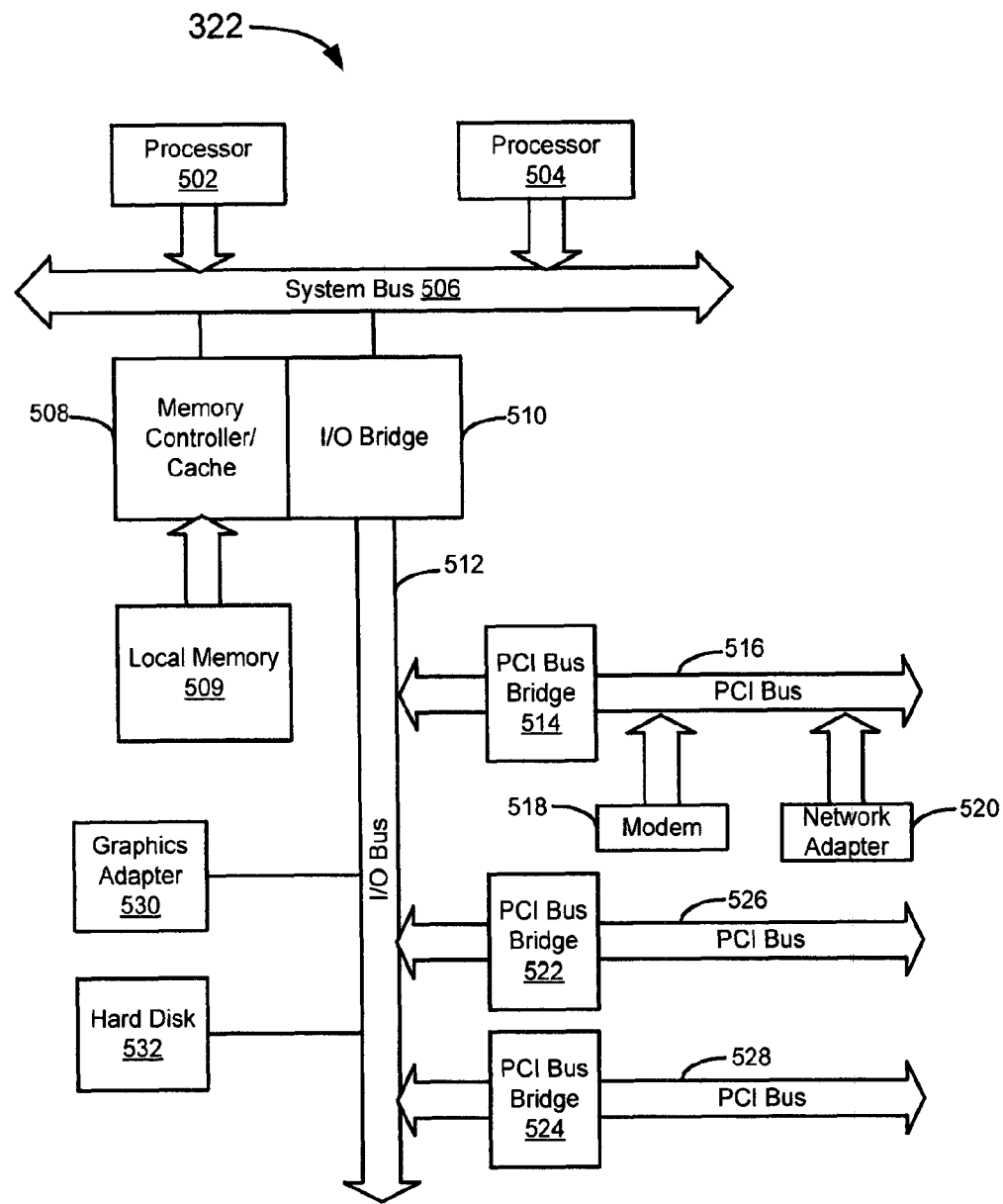
FIG. 5 depicts a block diagram of a data processing system that may be implemented as a convergence server in accordance with an embodiment of the present invention.

FIG. 5 depicts a block diagram of a data processing system that may be implemented as a convergence server 322 in accordance with an embodiment of the present invention. CS 322 may be a symmetric multiprocessor (SMP) system including a plurality of processors 502 and 504 connected to a system bus 506. Alternatively, a single processor system may be employed. Also connected to system bus 506 is memory controller/cache 508 which provides an interface to local memory 509. An I/O bus bridge 510 is connected to system bus 506 and provides an interface to an I/O bus 512. Memory controller/cache 508 and I/O bus bridge 510 may be integrated as depicted.

Peripheral component interconnect (PCI) bus bridge 514 connected to I/O bus 512 provides an interface to PCI local bus 516. A number of modems may be connected to a PCI local bus 216. Communication links to clients may be provided through a modem 518 and network adapter 520 connected to PCI local bus 516 through add-in connectors.

Additional PCI bus bridges 522 and 524 provide interfaces for additional PCI local buses 526 and 528, from which additional modems or network adapters may be supported. In this manner, server 322 allows connections to multiple system nodes. A memory-mapped graphics adapter 530 and hard disk 532 may also be connected to I/O bus 512 as depicted, either directly or indirectly.

Those of ordinary skill in the art will appreciate that the hardware depicted in FIG. 5 may vary. For example, other peripheral devices, such as optical disk drives and the like, also may be used in addition to or in place of the hardware depicted. The depicted example is not meant to imply architectural limitations with respect to the present invention.

While the CS 322 depicted in FIG. 5 comprises an SMP system, it should be understood that any variety of server configurations and implementations may be substituted therefor. The depicted server 322 is provided only to facilitate an understanding of disclosed embodiments, and the configuration of the CS 322 is immaterial with regard to the disclosed embodiments.

In many CDMA networks, a subscriber is uniquely identified by the combination of an electronic serial number (ESN)

and a mobile identification number (MIN). A mobile equipment identifier (MEID) is an extension of the ESN that facilitates an increase in the number of manufacturers' codes. A pseudo-ESN (p-ESN) may be derived from the MEID to be used in place of the ESN. The MIN-ESN, or MIN-p-ESN, combination is used primarily for registration and authentication functions. Contemporary CDMA MSs may support an international mobile station identity (IMSI) and use the IMSI in place of the MIN to offer an improved address space and utilization by international applications. With the introduction of IMSI, the concept of a mobile station identity may be either an MIN or an IMSI. Due to the variations in different parameters for identification, it is assumed herein that a unique identifier is included in the username portion of the To Header of a SIP: REGISTER request to create and identify the mobile station subscriber during the registration procedures described hereinbelow. This unique identifier is referred to herein as the register ID. An optional network dependent predefined prefix may be stripped from the register ID prior to use in the convergence server functions. The register ID may contain an MIN or an IMSI paired with either an MEID, an ESN, or a p-ESN. However, other options may be suitably implemented without departing from the disclosed embodiments.

In accordance with an embodiment, the CS 322 emulates the functionality of a MSC and Visitor Location Register (VLR) to facilitate authentication and registration of MSs in a carrier's CDMA network. To this end, the CS 322 may interface with the HLR 314 for authentication, location updates, and other services using an IS-41 interface.

In a pre-IMS environment, e.g., such as network system 300 depicted in FIG. 3A, the CS 322 receives a SIP:REGISTER message directly from the femtocell system 350, or from the femtocell system 350 acting as a proxy for the MS 325. The CS 322 provides SIP registration functions and is the central interface point to the softswitch/MGCF 324 and VOIP elements.

In an IMS network such as network system 301 depicted in FIG. 3B, the CS 322 functions as an IMS application server, and the IMS infrastructure provides the centralized interface control and signaling including SIP registration functions. In this environment, the femtocell system 350 itself, or alternatively the femtocell system 350 acting as a proxy for the MS 325, sends a SIP:REGISTER (e.g., via other CSCFs) to the S-CSCF which performs a third-party registration of the MS 325 with the CS 322 based on initial filter criteria stored in the HSS 329.

In an embodiment, the femtocell system 350 may be configured to support "Global Challenge" based authentication on all system access (e.g., Registration, Call Origination, Call Termination, and Data Burst messages). The femtocell system may indicate a Global Challenge request by setting an authentication bit (e.g., AUTH=1) in the overhead message train (OMT). The femtocell system 350 may also include a global random challenge value (RAND) used in generating the authentication result by both the MS and the HLR/AC.

The femtocell system preferably establishes an IPsec tunnel over the broadband network with the PDIF 332 or, alternatively, a P-CSCF before sending any SIP traffic to the CS 322. The IPsec tunnel may be established immediately after the femtocell system 350 is powered on or when an MS 325 attempts to establish a connection with the femtocell system 350. In this implementation, the CS 322 is not involved in establishing the IPsec tunnel.

In an embodiment, the CS 322 may be configured to receive CDMA-1x authentication data at the end of a SIP registration message using a SIP:MESSAGE received from the femtocell system 350. In this manner, the CS 322 conveys the result of the 1x authentication and, if needed, performs various authentication procedures, such as a unique challenge, SSD update, and a call history count.

Figure 6:
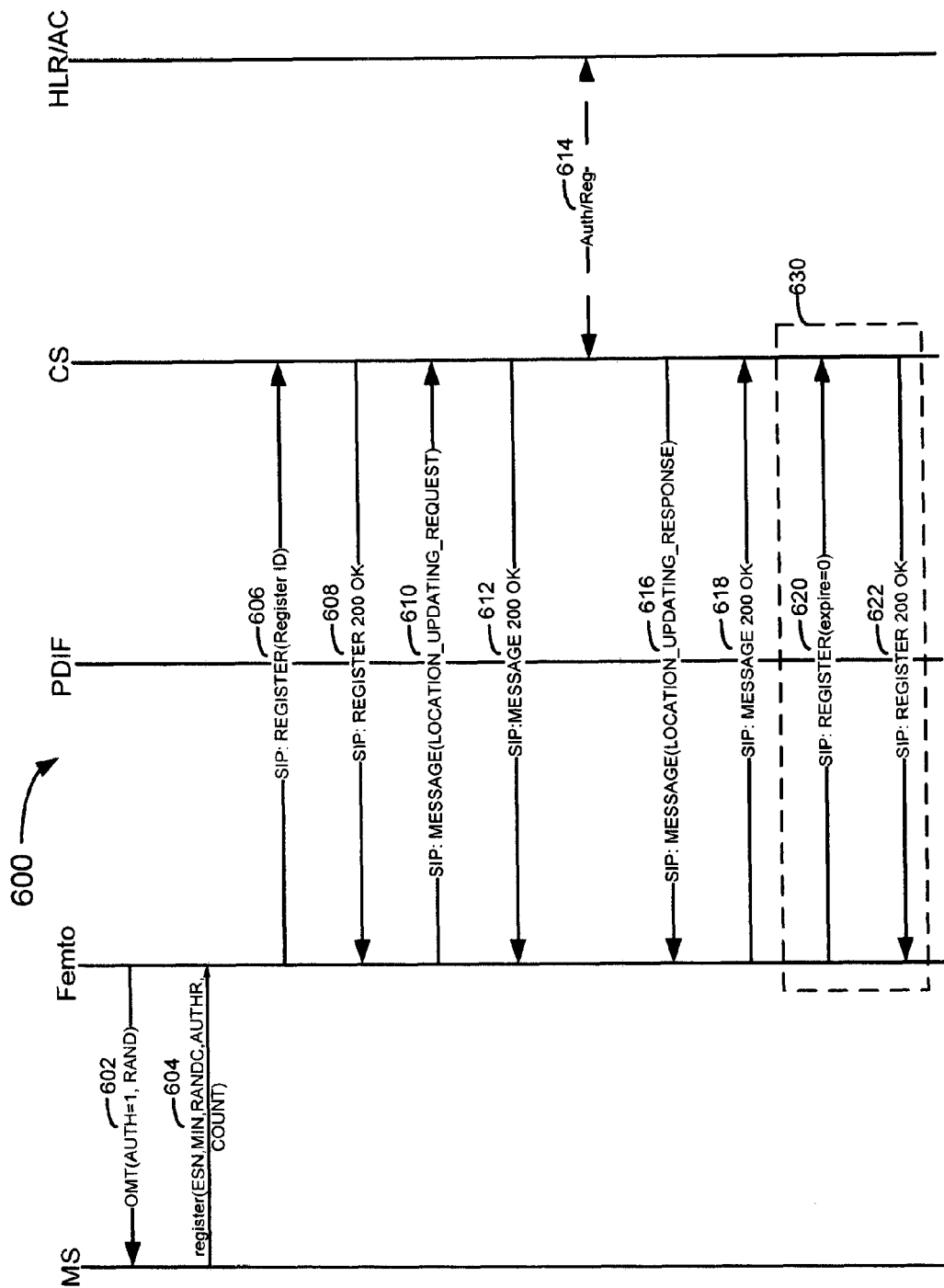
FIG. 6 depicts a diagrammatic representation of a registration and authentication process on initial system access by a mobile station via a femtocell system in a non-Internet Protocol Multimedia Subsystem network implemented in accordance with an embodiment.

FIG. 6 depicts a diagrammatic representation of a registration and authentication process 600 on initial system access by an MS via a femtocell system in a non-IMS network, such as network system 300 depicted in FIG. 3A, implemented in accordance with an embodiment. A SIP registration phase is invoked by transmission of an OMT by the femtocell system 350 (step 602). An OMT facilitates autonomous registration and may, for example, be transmitted on paging/access channels. Transmission of the OMT by the femtocell system 350 may be made at a predefined interval, e.g., once a second. The OMT may include parameters for system and region identification and may be distinguished from OMTs transmitted by other entities, e.g., by macro BTSs. An MS 325 in idle mode may detect the OMT when the MS 325 is within range of the femtocell system 350. In accordance with an embodiment, the OMT transmitted by the femtocell system 350 includes an authentication bit (AUTH) having a value, e.g., "1", that indicates authentication is required for all system access. Further, the OMT includes a random number (RAND) generated by the femtocell system 350.

Based on the values in the OMT, the MS determines that a new serving system has been encountered and that authentication is required based on the authentication bit value (AUTH=1). Subsequently, the MS 325 attempts to obtain the random number (RAND) to be used for the authentication from the OMT. If the random number is not available, a zero value may be used by the MS as prescribed by TR-45 authentication procedures. The MS 325 then generates an authentication result (AUTHR). For example, the MS 325 may generate an authentication result from a shared secret data key (SSD-A) stored by the MS 325, the ESN or p-ESN, the MIN, and the RAND value obtained from the OMT. The authentication result may be generated, for example, by execution of the well known CAVE algorithm by the MS 325. The MS then transmits a registration request to the femtocell system 350 (step 604). The register message may include the MS's MIN, ESN or p-ESN, the authentication result (AUTHR), a CallHistoryCount (COUNT), and a random confirmation (RANDC) derived from the random number (RAND) used to compute the authentication result (AUTHR).

On receiving the registration request from the MS 325, the femtocell system 350 sends a SIP:REGISTER message to the CS 322 (step 606) in accordance with an embodiment. Optionally, the femtocell system 350 may establish an IPsec tunnel with the PDIF 332. The CS 322 then acknowledges receipt of the SIP:REGISTER message by transmitting a 200 OK SIP response to the femtocell system 350 (step 608).

A registration phase is then invoked by the femtocell system 350 transmitting 1x authentication parameters received from the MS 325 at step 604 to CS 322 in a SIP: MESSAGE (LOCATION_UPDATING_REQUEST) (step 610). The location updating request message includes the random number (RAND) rather than the random number confirmation (RANDC). The location updating request message additionally may include parameters, such as a Register ID, ESN, MEID, MIN, IMSI, etc. Using the Register ID, the CS 322 may associate the location updating request with the preceding SIP:REGISTER request received thereby from the femtocell system 350 in step 606. If the location updating request message includes a P-Access-Network-Info (PANI) header that may specify information about the access technology, the CS 322 may save the PANI information.

The CS 322 acknowledges receipt of the location updating request message by transmitting a 200 OK SIP response to the femtocell system 350 (step 612). Network authentication and registration then occurs via exchanges between the CS 322 and HLR/AC (step 614). As part of the authentication response, the HLR/AC may trigger Unique Challenge, SSD update, or CountUpdate procedures.

The CS 322 informs the femtocell system 350 of the authentication and registration results by transmitting a SIP location updating response message to the femtocell system 350 (step 616). In the event of an authentication or registration failure, the CS 322 may send a SIP:MESSAGE containing, for example, an XML-encoded message body that facilitates deregistration of the femtocell system 350. The femtocell system 350 acknowledges receipt of the authentication and registration results by sending a 200 OK SIP response to the CS 322 (step 618). In the event of either a registration or authentication failure, a deregistration process 630 is invoked by the femtocell system 350 transmitting a deregistration message, e.g., a SIP: REGISTER message with an expire value "0", to the CS 322 (step 620). The CS 322 acknowledges receipt of the deregistration message by transmitting a 200 OK SIP response to the femtocell system 350 (step 622).

Figure 7:
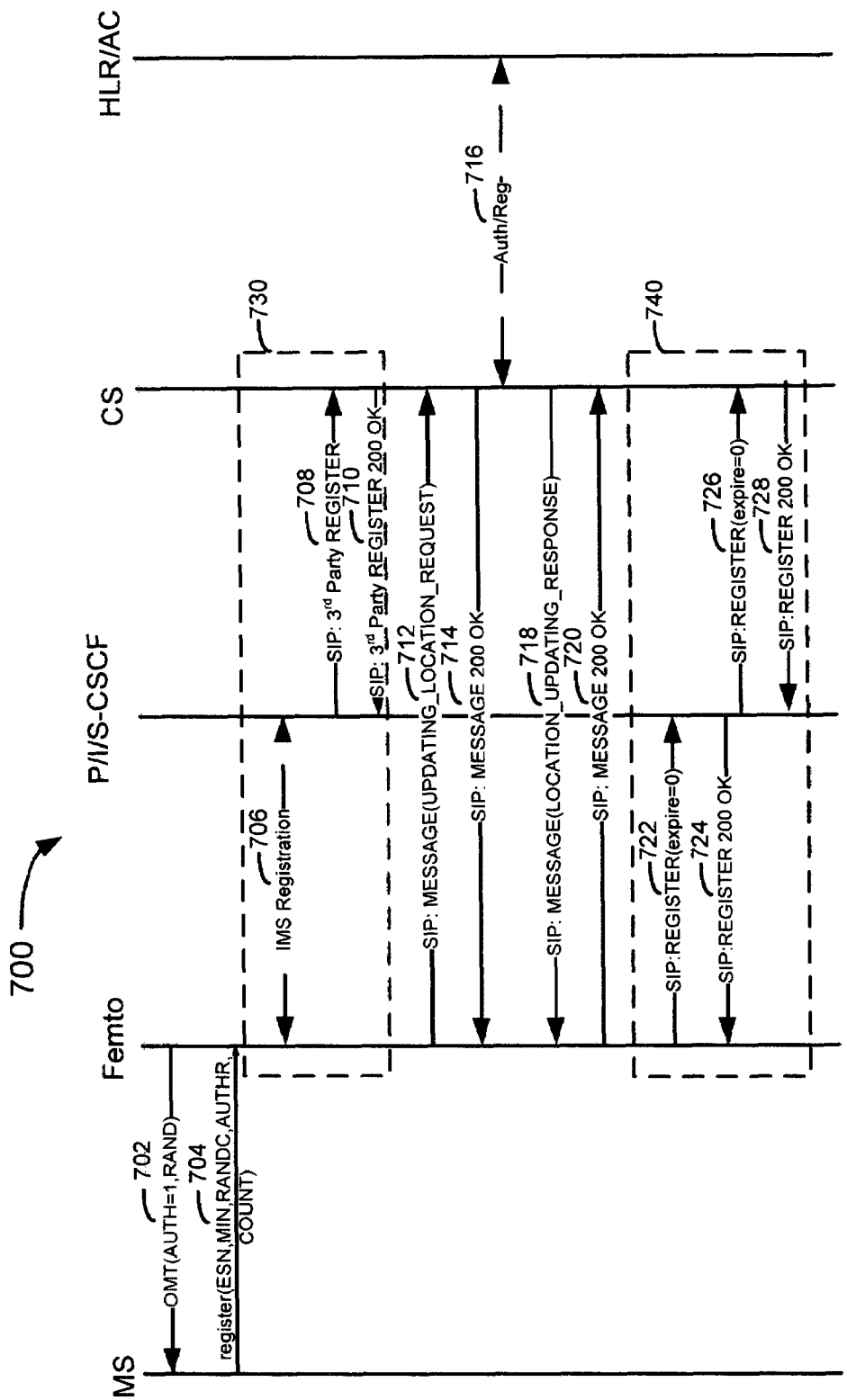
FIG. 7 depicts a diagrammatic representation of a registration and authentication process on initial system access by a mobile station via a femtocell system in an Internet Protocol Multimedia Subsystem network implemented in accordance with an embodiment.

FIG. 7 depicts a diagrammatic representation of a registration and authentication process 700 on initial system access by an MS via a femtocell system in an IMS network, such as network system 301 depicted in FIG. 3B, implemented in accordance with an embodiment. In this implementation, it is assumed that the MS comprises a standard 1x mobile phone and the femtocell system 350 is configured to operate as an IMS client on behalf of the mobile stations attached with the femtocell system 350. When an MS attempts to establish a connection with the femtocell system 350, the femtocell system 350 first attempts to register in the IMS network on behalf of the MS. As part of the registration, the IMS network may perform IMS-AKA authentication or, alternatively, allow the registration without performing any authentication. Further, in the described implementation, it is assumed that the CS 322 is configured to act as an application server (AS) in the IMS domain, and that it receives 3rd-party registration requests from the S-CSCF at the end of the IMS network registration process.

The femtocell system 350 transmits an OMT (step 702) at a predefined interval. An MS 325 in idle mode may detect the OMT when the MS 325 is within range of the femtocell system 350 as described above with reference to FIG. 3A. The OMT transmitted by the femtocell system 350 may include an authentication bit (AUTH) having a value, e.g., "1", that indicates authentication is required for all system access, and a random number (RAND) generated by the femtocell system 350. On receipt of the OMT, the MS determines that a new serving system has been encountered and that authentication is required based on the authentication bit value (AUTH=1). Subsequently, the MS 325 attempts to obtain the random number (RAND) to be used for the authentication from the OMT. If the random number is not available, a zero value may be used by the MS as prescribed by TR-45 authentication procedures. The MS 325 then generates an authentication result (AUTHR), and transmits a registration request to the femtocell system 350 (step 704). The registration message may include the MS's MIN, ESN or p-ESN, the authentication result (AUTHR), a CallHistoryCount (COUNT), and a random number confirmation (RANDC) derived from the random number (RAND) used to compute the authentication result (AUTHR).

An IMS registration phase 730 is then initiated by the femtocell system 350 sending a registration request to the S-CSCF (step 706). The S-CSCF then sends a 3rd-party registration request to the CS 322 (step 708), and the CS 322 returns a 200 OK SIP response to the S-CSCF (step 710) for the 3rd-party registration which completes the IMS network registration.

If the registration fails, the CS 322 informs the femtocell system 350 to perform IMS network deregistration. Assuming the registration is successful, an authentication process is then invoked by the femtocell system 350 transmitting 1x authentication parameters received from the MS 325 at step 704 to CS 322 in a SIP: MESSAGE(LOCATION_UPDATING_REQUEST) (step 712). The location updating request message includes the random number (RAND) rather than the random number confirmation (RANDC). The location updating request message additionally may include parameters, such as a Register ID, ESN, MEID, MIN, IMSI, etc. If the location updating request message includes a P-Access-Network-Info (PANI) header that may specify information about the access technology, the CS 322 saves the PANI information.

The CS 322 acknowledges receipt of the location updating request message by transmitting a 200 OK SIP response to the femtocell system 350 (step 714). Network authentication and registration then occurs via exchanges between the CS 322 and HLR/AC (step 716). As part of the authentication response, the HLR/AC may trigger Unique Challenge, SSD update, or CountUpdate procedures.

The CS 322 informs the femtocell system 350 of the authentication and registration results by transmitting a SIP location updating response message to the femtocell system 350 (step 718). In the event of an authentication or registration failure, the CS 322 may send a SIP:MESSAGE containing, for example, an XML-encoded message body that facilitates deregistration of the femtocell system 350. The femtocell system 350 acknowledges receipt of the authentication and registration results by sending a 200 OK SIP response to the CS 322 (step 720).

In the event of either a registration or authentication failure, a deregistration process 740 is invoked by the femtocell system 350 transmitting a deregistration message, e.g., a SIP: REGISTER message with a expire value "0", to the S-CSCF (step 722). The S-CSCF acknowledges receipt of the deregistration message by transmitting a 200 OK SIP response to the femtocell system 350 (step 724). The S-CSCF then transmits the deregistration message to the CS 322 (step 726) which acknowledges receipt of the deregistration message by transmitting a 200 OK SIP response to the S-CSCF (step 728) thereby completing deregistration of the MS.

As described, mechanisms for facilitating mobile station registration and authentication via a femtocell system are provided. A femtocell system may generate a register identification of a mobile station from one or more mobile station authentication parameters. On receipt of a registration request from a mobile station, the femtocell system may transmit a registration request to a core network on behalf of the mobile station. The registration request transmitted by the femtocell system preferably includes the register identification generated by the femtocell system. In an embodiment, the convergence server may be located in an Internet Protocol core network. In this configuration, the convergence server may be configured to emulate a mobile switching center. On receipt of a registration request from the femtocell system, the convergence server may engage in a registration and authentication procedure with a radio access network Home Location Register and/or Authentication Center on behalf of the mobile station. In another implementation, the convergence server may be located in an Internet Protocol Multimedia Subsystem (IMS) core network. In this configuration, the convergence server is emulated as an IMS application server. The femtocell system transmits the register request to a serving-call session control function (S-CSCF) that, in turn, initiates a third-party registration process with the convergence server on behalf of the mobile station. The convergence server then performs authentication and registration procedures with the radio access network HLR and/or AC and notifies the femtocell system of either success or failure of the mobile station authentication and registration.

The illustrative block diagrams depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single processor or multiple processors. Additionally, various steps of embodiments of the invention may provide one or more data structures generated, produced, received, or otherwise implemented on a computer-readable medium, such as a memory.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method of providing mobile station registration and authentication services in a network system, comprising:
    generating, by the femtocell system, a registration identifier of the mobile station from at least one authentication parameter;
    receiving, by a convergence server located in a first core network, a session initiation protocol registration request for a mobile station transmitted to the first core network;
    receiving, by the convergence server from the femtocell and in a separate message from the session initiation protocol registration request, authentication parameters of the mobile station, the authentication parameters comprising the registration identifier;
    performing, by the convergence server, authentication and registration procedures with a radio access core network on behalf of the mobile station;
    emulating, by the convergence server, a Mobile Switching Center; and
    authenticating, by the convergence server, the mobile station with at least one of a Home Location Register and an authentication center located in the radio access core network.

2. The method of claim 1, further comprising:
    transmitting, by the femtocell system, an overhead message train with an indicator that authentication is required for system access; and
    receiving, by the femtocell system, a registration request from the mobile station responsive to the mobile station receiving the overhead message train, wherein the authentication parameters are included in the registration request.

3. The method of claim 2, further comprising generating, by the femtocell system, a random number, wherein the random number is included in the overhead message train.

4. The method of claim 1, further comprising: receiving, by the convergence server, the registration identifier in a session initiation protocol register message.

5. A non-transitory computer-readable medium having computer-executable instructions tangibly embodied thereon for execution by a processing system, the computer-executable instructions for facilitating mobile station registration and authentication services in a network system that, when executed, cause the processing system to:
    generate a registration identifier that is associated with a mobile station from at least one of a plurality of authentication parameters of the mobile station;
    receive, by a convergence server located in a first core network, a session initiation protocol registration request for the mobile station transmitted to the first core network;
    receive, by the convergence server from the femtocell and in a separate message from the session initiation protocol registration request, the plurality of authentication parameters of the mobile station;
    perform, by the convergence server, authentication and registration procedures with a radio access core network on behalf of the mobile station.

6. The non-transitory computer-readable medium of claim 5, further comprising instructions that, when executed by the processing system, cause the processing system to:
- transmit, by the femtocell system, an overhead message train with an indicator that authentication is required for system access; and
- receive, by the femtocell system, a registration request from the mobile station responsive to the mobile station receiving the overhead message train, wherein the authentication parameters are included in the registration request.

7. The non-transitory computer-readable medium of claim 6, further comprising instructions that, when executed, cause the processing system to generate, by the femtocell system, a random number, wherein the random number is included in the overhead message train.

8. The non-transitory computer-readable medium of claim 5, further comprising instructions that, when executed by the processing system, cause the processing system to generate, by the femtocell system, a registration identifier of the mobile station from at least one of the authentication parameters.

9. The non-transitory computer-readable medium of claim 8, further comprising computer-executable instructions that, when executed by the processing system, cause the processing system to receive, by the convergence server, the registration identifier in a session initiation protocol register message.

10. A network system that provides mobile station registration and authentication services, comprising:
- a first core network that includes a convergence server;
- a radio access core network;
- an Internet Protocol-based femtocell system that provides a radio access point for one or more mobile stations, wherein the femtocell system periodically transmits an overhead message train that includes a random number generated by the femtocell system, wherein a mobile station receives the overhead message train, calculates a registration authentication result from data including the random number, and transmits a registration request including the registration authentication and a plurality of authentication parameters, wherein the femtocell system generates a register identifier that is associated with the mobile station from at least one of the plurality of authentication parameters, wherein the convergence server receives from the femtocell system a session initiation protocol registration request for the mobile station transmitted to the first core network and, in a separate message from the session initiation protocol registration request, the plurality of authentication parameters of the mobile station, and performs authentication and registration procedures with the radio access core network on behalf of the mobile station.

11. The system of claim 10, wherein the femtocell system generates the registration identifier from at least one of the plurality of authentication parameters.

* * * * *